US008990885B2

(12) United States Patent
Chang et al.

(10) Patent No.: US 8,990,885 B2
(45) Date of Patent: Mar. 24, 2015

(54) ZONE-BASED FIREWALL POLICY MODEL FOR A VIRTUALIZED DATA CENTER

(71) Applicant: Cisco Technology, Inc., San Jose, CA (US)

(72) Inventors: David Chang, Milpitas, CA (US); Abhijit Patra, Saratoga, CA (US); Nagaraj Bagepalli, Fremont, CA (US); Rajesh Kumar Sethuraghavan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/945,091

(22) Filed: Jul. 18, 2013

(65) Prior Publication Data

US 2013/0312056 A1 Nov. 21, 2013

Related U.S. Application Data

(63) Continuation of application No. 13/180,678, filed on Jul. 12, 2011, now Pat. No. 8,516,241.

(51) Int. Cl.
*H04L 29/08* (2006.01)
*H04L 29/06* (2006.01)
*H04L 12/931* (2013.01)
*H04L 12/12* (2006.01)

(52) U.S. Cl.
CPC ...... *H04L 29/08972* (2013.01); *H04L 63/0218* (2013.01); *H04L 63/0263* (2013.01); *H04L 49/70* (2013.01); *H04L 49/356* (2013.01); *H04L 29/08927* (2013.01)
USPC ..................................... 726/1; 718/1; 726/11

(58) Field of Classification Search
None
See application file for complete search history.

(56) References Cited

U.S. PATENT DOCUMENTS

| | | |
|---|---|---|
| 2006/0095960 A1 | 5/2006 | Arregoces et al. |
| 2008/0072284 A1 | 3/2008 | Horvitz et al. |
| 2009/0254843 A1 | 10/2009 | Van Wie et al. |
| 2009/0265755 A1 | 10/2009 | Hamilton et al. |
| 2010/0281533 A1 | 11/2010 | Mao et al. |
| 2011/0067107 A1 | 3/2011 | Weeks et al. |
| 2011/0113467 A1* | 5/2011 | Agarwal et al. .................. 726/1 |
| 2013/0019277 A1 | 1/2013 | Chang et al. |

* cited by examiner

*Primary Examiner* — Venkat Perungavoor
(74) *Attorney, Agent, or Firm* — Edell, Shapiro & Finnan, LLC

(57) ABSTRACT

Techniques are provided for implementing a zone-based firewall policy. At a virtual network device, information is defined and stored that represents a security management zone for a virtual firewall policy comprising one or more common attributes of applications associated with the security zone. Information representing a firewall rule for the security zone is defined and comprises first conditions for matching common attributes of applications associated with the security zone and an action to be performed on application traffic. Parameters associated with the application traffic are received that are associated with properly provisioned virtual machines. A determination is made whether the application traffic parameters satisfy the conditions of the firewall rule and in response to determining that the conditions are satisfied, the action is performed.

20 Claims, 13 Drawing Sheets

ZONE-BASED FIREWALL POLICY MODEL FOR A VIRTUALIZED DATA CENTER

CROSS REFERENCE TO RELATED APPLICATIONS

This application is a continuation of U.S. patent application Ser. No. 13/180,678, filed Jul. 12, 2011, and entitled "Zone-Based Firewall Policy Model for a Virtualized Data Center," the entire contents of which are hereby incorporated by reference.

TECHNICAL FIELD

The present disclosure generally relates to provisioning virtual firewalls in a virtualized network environment.

BACKGROUND

Server and desktop virtualization is dramatically changing the enterprise network by creating many "virtual networks" which connect virtual machines and the physical networks through virtual switches. In this new network paradigm, many new network services requirements are imposed on modern IT network infrastructure. For example, in a virtual network, inter-virtual machine (VM) communication is a blind spot because this traffic never reaches the physical network, making it unprotected by a physical network security appliance. The absence of protection in a virtual network becomes a key security concern in a virtualized data center, especially in a multi-tenant cloud service provider data center environment where it is required to deploy a virtual service that serves as a segmentation firewall for all the managed virtual machines.

DESCRIPTION OF EXAMPLE EMBODIMENTS

Overview

Techniques are provided herein for implementing a zone-based firewall policy. At a virtual network device, information is defined and stored that represents a security management zone for a virtual firewall policy comprising one or more common attributes of applications associated with the security zone. Information representing a firewall rule for the security zone is defined and comprises first conditions for matching common attributes of applications associated with the security zone and an action to be performed on application traffic. Parameters associated with the application traffic are received that are associated with properly provisioned virtual machines. A determination is made whether the application traffic parameters satisfy the conditions of the firewall rule and in response to determining that the conditions are satisfied, the action is performed.

Example Embodiments

Figure 1:
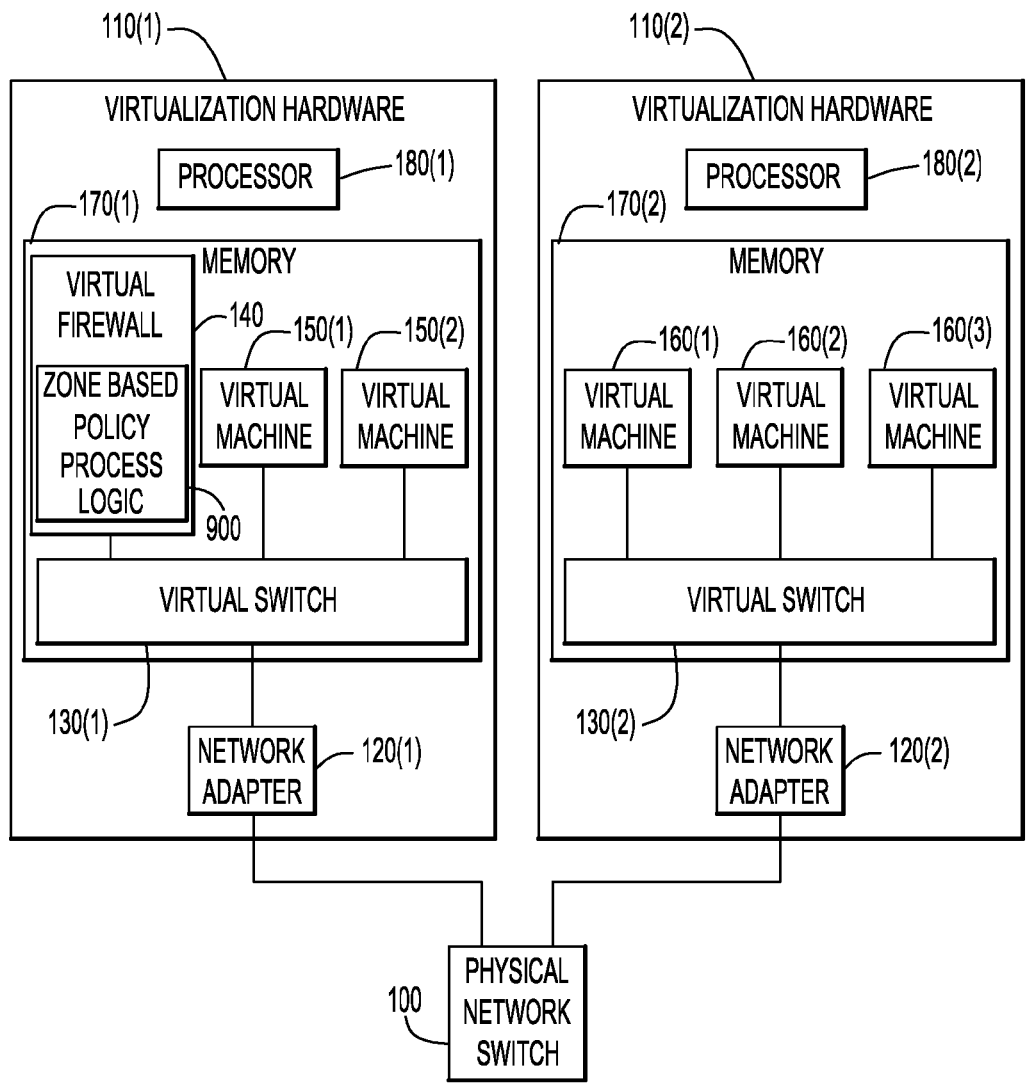
FIG. 1 is an example of a block diagram of the relevant portions of a physical network switch that is configured to implement a virtual firewall with a zone-based policy according to the techniques described herein.

Referring first to FIG. 1, a physical network switch 100 is shown. The switch 100 comprises two sets of virtualization hardware 110(1) and 110(2), e.g., hypervisors. Each set of virtualization hardware 110(1) and 110(2) comprises, respectively, network adapters 120(1) and 120(2), virtual switches 130(1) and 130(2), memories 170(1) and 170(2), and processors 180(1) and 180(2). The virtualization hardware 110(2) hosts a plurality of virtual machines 160(1)-160(3) while virtualization hardware 110(1) hosts a plurality of virtual machines 150(1) and 150(2), as well a virtual firewall 140. The virtualization hardware may comprise line cards, or other pluggable or connectable hardware with respect to switch 100. Other hardware software or hardware logic may be employed.

The network adapters 120(1) and 120(2) provide physical connectivity between virtualization hardware 110(1) and 110(2), and any external network that may be coupled to switch 100. Virtual switches 130(1) and 130(2) provide switching internal to their respective virtualization hardware modules as well as external switching functions. Virtual machines 150(1), 150(2), and 160(1)-160(3) may provide application, data, and/or host services. The virtual firewall 140 is provisioned with zone based policy process logic 900 for enforcing rules for traffic ingressing and egressing virtual machines 150(1), 150(2), and 160(1)-160(3), according to the techniques described herein. Process logic 900 may also be implemented in hardware or be implemented in a combination of both hardware and software.

For simplicity, the memories 170(1) and 170(2), and processors 180(1) and 180(2) will be described with respect to virtualization hardware 110(1). The processor 180(1) is, for example, a microprocessor, a microcontroller, systems on a chip (SOCs), or other fixed or programmable logic. The memory 170(1) may be any form of random access memory (RAM), read only memory (ROM), FLASH memory, disk storage, or other tangible (non-transitory) memory media (device or devices) that stores data used for the techniques described herein. The memory 170(1) may be separate or part of the processor 180(1). One or more computer readable storage media is encoded with software comprising computer executable instructions and when the software is executed operable to perform the operations of the process logic 900. Said another way, instructions for performing the process logic 900 may be stored in the memory 170(1) for execution by the processor 180(1) such that when executed by the processor, causes the processor to perform the operations describe herein in connection with the remainder of the figures. Process logic 900 may be stored on other tangible non-transitory (but physically portable or movable) memory such as forms of read only memory (ROM), erasable/programmable or not, or other non-volatile memory (NVM), e.g., boot memory for virtualization hardware module 110(1). It should be understood that any of the devices in described herein, e.g., switch 100, and may be configured with a similar hardware or software configuration as virtualization hardware module 110(1).

The functions of the processor 180(1) may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 170(1) stores data used for the computations or functions described herein (and/or to store software or processor instructions that are executed to carry out the computations or functions described herein). Thus, functions of the process logic 900 may be implemented with fixed logic or programmable logic (e.g., software or computer instructions executed by a processor or field programmable gate array (FPGA)). The process logic 900 executed by a host, e.g. virtualization hardware module 110(1), has been generally described above and will be further described in connection with FIGS. 2-6, and further specific example embodiments will be described in connection with FIG. 9.

In addition, non-VM traffic may be supported by switch 100, e.g., configuration communication. For example, the switch 100 may need to support traffic for Internet Small Computer System Interface (iSCSI) communications, Network File System (NFS) operations, Fault Tolerance, VM migration, and other management functions. These additional traffic types may each share or have their own class of service and may operate using their own virtual network interfaces, e.g., by way of a virtual machine kernel interfaces (vmks).

Figure 2A:
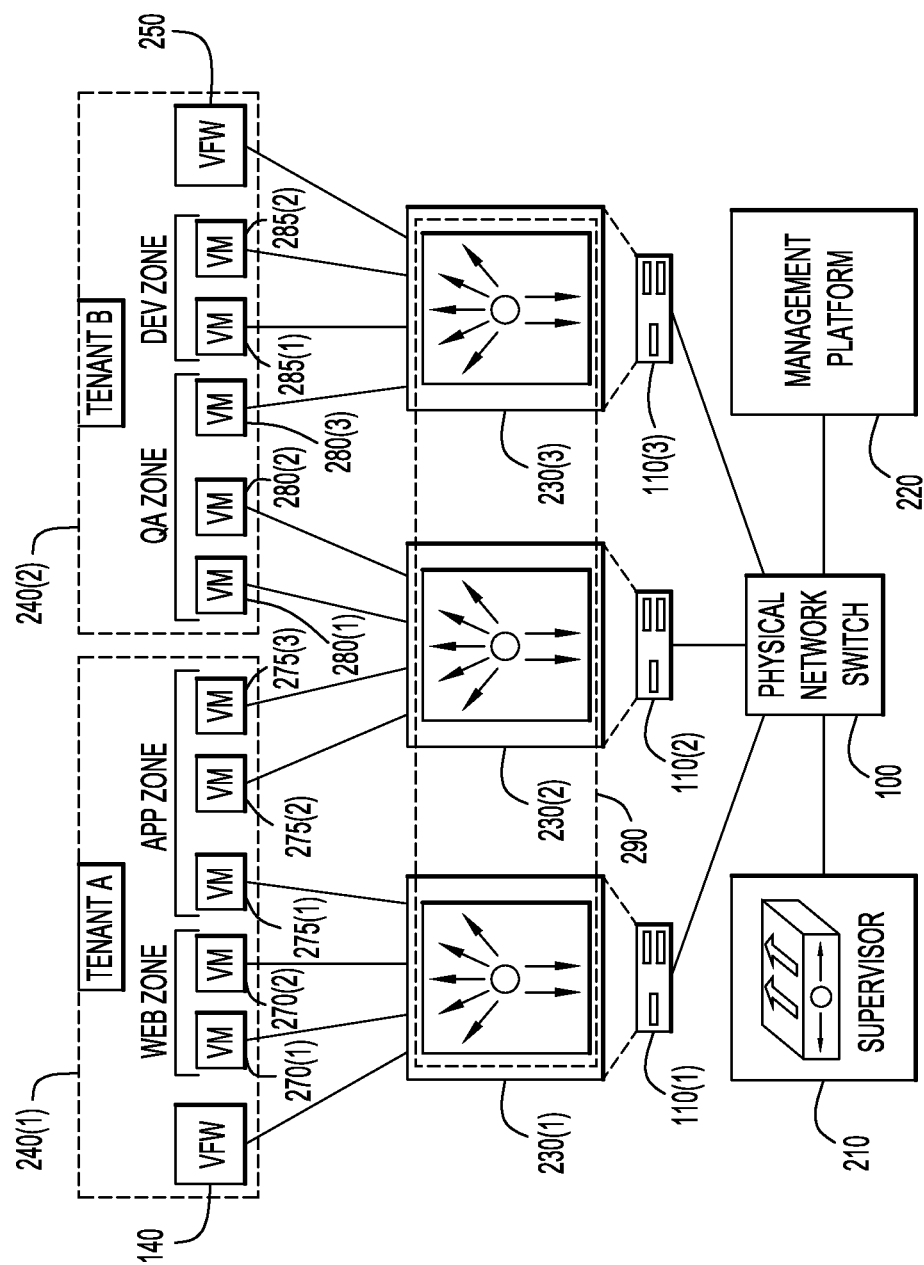
FIG. 2A is an example of a block diagram of a network within a virtualized data center having virtual network modules that are configured to implement virtual firewalls with the zone-based policy according to the techniques described herein.

Turning to FIG. 2A, relevant portions of a virtualized environment of a data center is shown. The environment comprises the physical network switch 100, a virtual supervisor module 210, a management platform 220, and a plurality of virtualization hardware modules 110(1)-110(3). Each of the virtualization hardware modules 110(1)-110(3) hosts virtual network modules 230(1)-230(3), respectively. The data center has two tenants or customers in which services associated with tenant A are shown at reference numeral 240(1) and services associated with tenant B are shown at reference numeral 240(2).

The supervisor module 210 allows a network team to manage the virtualization hardware modules 110(1)-110(3) and to manage network policies by way of port profiles as described hereinafter. The management platform 220 is used by a security team to manage virtual security gateways and security policies, e.g., using security profiles, and by a server team, to manage the various VMs.

In this example, Tenant A has a dedicated virtual firewall (VFW) 140 while tenant B has a dedicated virtual firewall 250. Each of the virtual firewalls 140 and 250 are configured to implement a zone-based firewall policy process by way of a policy engine which is designed for enforcing zone-based firewall policy against network traffic. The zone-based firewall policy process will generally be described in connection with FIGS. 2A, 2B, and 3, and described in greater detail in connection with FIGS. 4, 5, and 9. Variations of the zone-based firewall policy process are described in connection with FIGS. 6A, 6B, 6C, 6D, 7A, 7B, and 8.

Each of tenants A and B access data center services via a plurality of VMs. For instance, Tenant A may provide web services and access applications, e.g., for a remote desktop user. To provide access to these features, Tenant A or data center management has set up a web zone that is serviced by VMs 270(1) and 270(2) and hosted via virtual network module 230(1) in virtualization hardware module 110(1), and an application zone that is serviced by VMs 275(1)-275(3) and hosted via virtual network modules 230(1) and 230(2) in virtualization hardware modules 110(1) and 110(2). Similarly, a quality assurance (QA) zone that is serviced by VMs 280(1)-280(3) and hosted via virtual network modules 230(2) and 20(3) in virtualization hardware modules 110(2) and 110(3), and a development zone that is serviced by VMs 285(1) and 285(2) and hosted via virtual network module 230(3) in virtualization hardware module 110(3) has been set up by or for Tenant B. The virtual network modules 230(1)-230(3) cooperate to host all of the VMs as indicated by the dashed line surrounding them at 290.

The VMs run on respective virtualization hardware modules that comprise hardware abstraction layers commonly known as hypervisors that provide operating system independence for the applications served by the VMs for the end users. Any of the VMs are capable of migrating from one physical host (or virtualization hardware) to another physical host in a relatively seamless manner using a process called VM migration, e.g., VM 270(1) may migrate from virtualization hardware module 110(1) to another virtualization hardware module, e.g., to virtualization hardware module 110(2), or to another physical host without interruption. The virtual network modules 230(1)-230(3) manage any interfaces needed for the VMs. In one example, the virtual network modules 230(1)-230(3) may be a software-based Virtual Ethernet Module (VEM) which runs in conjunction with the hypervisor to provide VM services, e.g., switching operations, Quality of Service (QoS) functions, as well as security and monitoring functions.

Figure 2B:
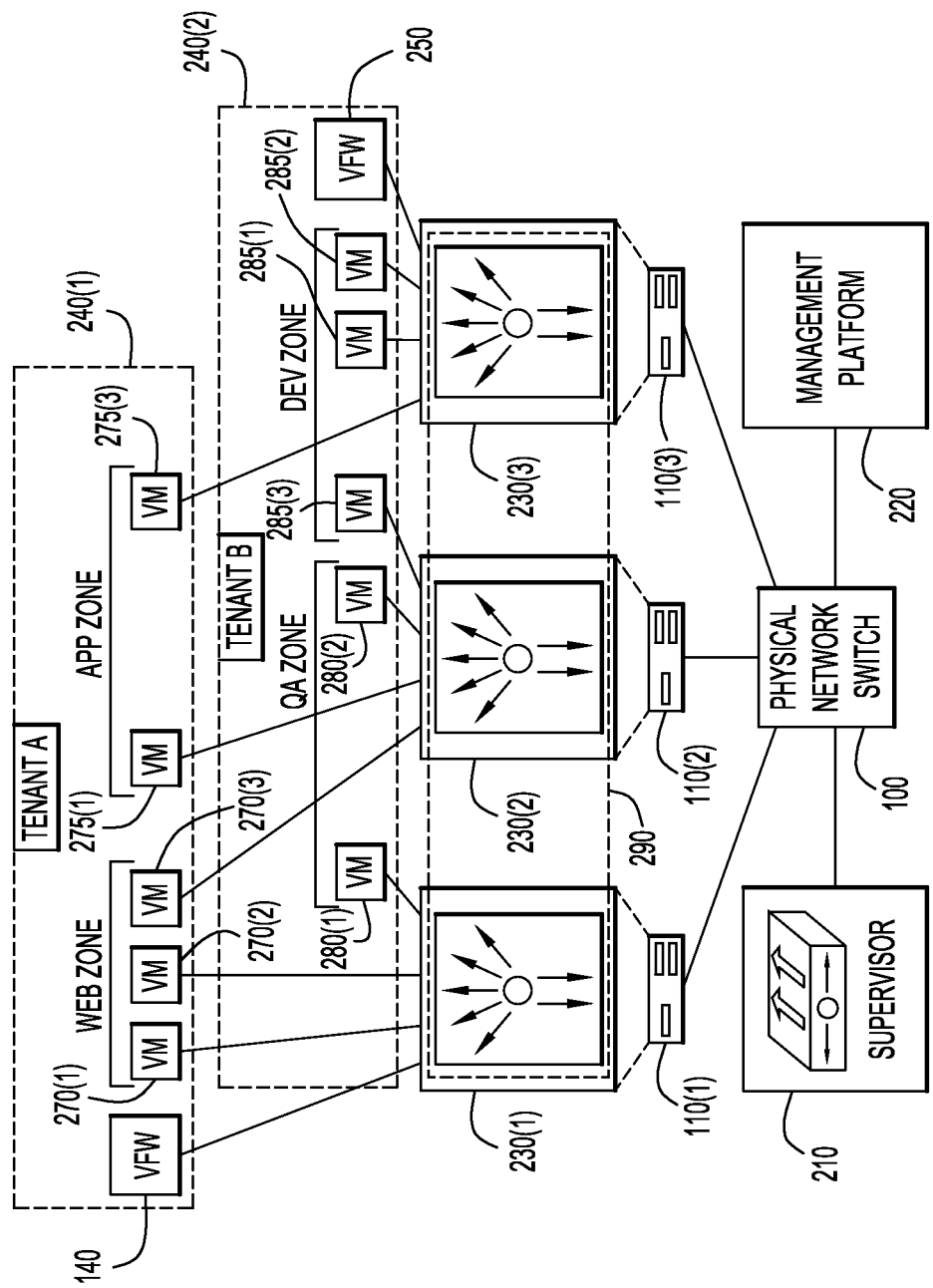
FIG. 2B is an example of a block diagram depicting the network shown in FIG. 2B after a period of time.

Referring to FIG. 2B, and with continued reference to FIG. 2A, the virtualization environment is shown after a period of time. Over time, various instances or instantiations of various types of virtual machines will be started, stopped, or migrated from one physical server to another based on system conditions, e.g., demand for certain services or various network or processor loads on the virtualization hardware modules 110(1)-110(3). Tenant A's web zone has VMs 270(1) and 270(2) as well as a new VM 270(3) that is hosted via virtual network module 230(2). The application zone no longer needs three VMs and VM 275(2) has been stopped or deallocated. The same is true for the QA zone and VM 280(3) has been stopped. In addition, the VM 280(1) has migrated from virtualization hardware module 110(2) to virtualization hardware module 110(1). The development zone has expanded to include new VM 285(3) that is hosted on virtualization hardware module 110(2).

The techniques described herein enable the data center management teams to efficiently manage the data center by applying a zone-based policy to each VM that will follow that VM when it migrates or is otherwise automatically attached to the VM when a VM is started in a particular security zone. The zone-based policy allows the virtual firewalls, e.g., the virtual firewalls 140 and 250, to police traffic to and from each VM based on its zone characteristics, whether or not the traffic physically leaves a switch or not. In other words, traffic exchanged between any two VMs may be policed based on zone policy regardless of where the VM physically resides. For example, an end user could be allowed to access Tenant A's web servers. Traffic exchanged between the end user and a web zone VM would enter and exit switch 100, while inter-VM traffic may or may not be physically exchanged outside of the switch 100.

Figure 3:
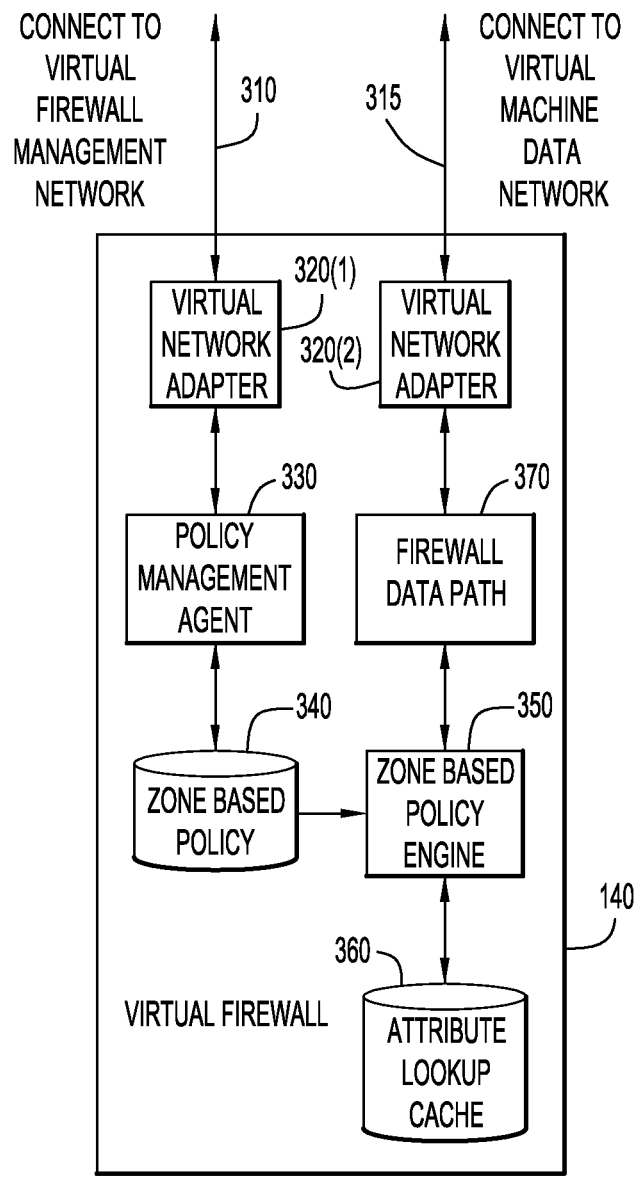
FIG. 3 is an example of a block diagram depicting a virtual firewall provisioned with the zone-based policy according to the techniques described herein.

Turning to FIG. 3, an example virtual firewall, e.g., virtual firewall 140, is shown. virtual firewall 140 comprises virtual network adapters 320(1) and 320(2) that provide a connection 310 to a virtual firewall management network, e.g., to management platform 220, and a connection 315 to the VM data network for inter-VM communication. The virtual firewall 140 has a policy management agent 330 and a zone based policy database 340 that is configured via connection 310. The virtual firewall 140 also has a zone based policy engine 350 that is used by a firewall data path module 370 that enforces the zone based policy for VM application data traffic. The zone based policy engine 350 has the benefit of an attribute lookup cache database 360. The modules 330-370 provide an efficient means of configuring and implementing the zone based policy process logic 900. Additional details regarding the implementation of the attribute lookup cache database 360 will be described in connection with FIGS. 7A, 7B, and 8.

Figure 4:
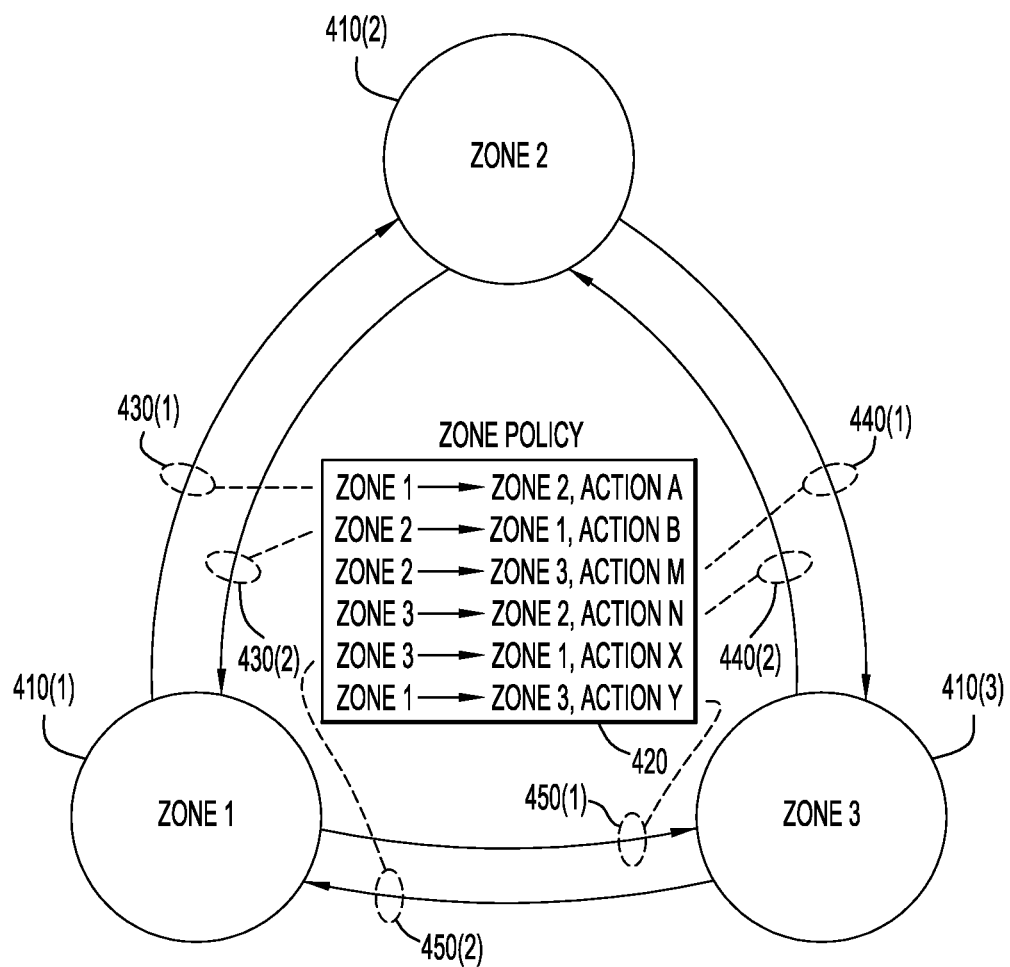
FIG. 4 is an example of a diagram depicting one implementation of the zone-based policy according to the techniques described herein.

Turning now to FIG. 4, a diagram depicting an example implementation of a zone-based policy used by a zone based policy engine for a virtual firewall, e.g., the zone based policy engine 350 that may be used by virtual firewall 140, will now be described. In this example, three security zones have been defined for zones 1, 2, and 3 shown at reference numerals 410(1)-410(3), respectively. The zone policy defined for inter-zone traffic is shown at 420. As shown at 420, there is a zone-based policy for each unidirectional link between each zone. For example, the first zone policy shown at 420 is for traffic sent from zone 1 to zone 2 as indicated at reference numeral 430(1), while the second zone policy is for traffic sent from zone 2 to zone 3 as indicated at reference numeral 430(2). As explained hereinafter, each zone policy has a set of one or more matching criteria or conditions, that when met, allow an "action" to be performed with respect to the inter-zone traffic, or not be performed when the conditions are not met.

Each virtual firewall has a zone management interface, e.g., policy management agent 330, which allows a zone manager to define security zones via a set of zone rules. A zone rule is a firewall rule-like construct that allows the zone manager to specify a set of conditions that can be used to associate incoming traffic to a set of security zones. These conditions can be written in an "English-like" construct using multiple attributes such as VM attributes, user defined attributes, or network attributes. For example, the zone manager may want to set up a "linux-web-zone" that defines a security zone that is defined for all the VMs that satisfy conditions specified within the zone rule, e.g., running Linux as its guest operating system (OS) and the VM name contains the substring "web". After the zone is created in the configuration, the name of the zone specified can be used for writing a firewall rule. For example, the text for creating the linux-web-zone may be entered via a command line interface (CLI) to create the zone:

```
> zone linux-web-zone
>     condition 1 vm.guest-os-name contains "linux"
>     condition 2 vm.name contains "web"
``` where ">" indicates a command prompt. It should be noted that any of the CLI commands described herein may be implemented via configuration files that are loaded upon network device boot or startup, via a remote procedure call, via a database, or any other convenient method of imparting a security policy to a virtual firewall.

When a firewall sees incoming network traffic, it first runs the traffic through all the zone rules in order to correlate the traffic with one or more zones, thereby associating or creating a zone membership in the one or more zones. Later, the zone membership associated with the traffic is used as criteria for enforcing the rule associated with a particular zone. An advantage of a zone rule approach is that the policy does not have to be updated when any VM or network attributes are changed. Thus, management overhead associated with policy management is reduced. Other advantage of the zone rule approach is the association of the incoming traffic with multiple zones. The multi-zone membership feature allows users to write a more sophisticated firewall policy for a data center that is running multiple tiered business applications.

The zone memberships (which are associated with traffic) are to be used as meta attributes for the firewall policy evaluation. Two facilities are enabled that allow security zones to be used as rule matching criteria in the zone-based policy model: first, a zone name is used as a matching attribute in a firewall rule, and second the zone manager can assign a directional sense to a zone attribute, e.g., a "src.zone.name" variable represents source zone name and a "dst.zone.name" variable indicates destination zone name. Thus, the zone itself becomes part of firewall rule matching criteria and there is no need to create a policy for any specific zone to zone communication. Accordingly, a hierarchical policy model may be implemented and zones may be used to aggregate traffic for multiple end-points. An example policy semantic may be written as "if src.zone is equal to zone1 and dst.zone is equal to zone2, HTTP traffic is permitted". Consider the following example firewall policy defined for inter-zone traffic:

```
> zone zone1
>     condition 1 vm.name contains "web"
> zone zone2
>     condition 1 vm.name contains "directory"
> rule zone1-to-zone2-rule
>     condition 1 src.zone.name equals "zone1"
>     condition 2 dst.zone.name equals "zone2"
>     condition 3 net.protocol equals TCP
>     condition 4 dst.net.port equals 80
>     action permit
```

In addition to zone definitions, a rule is defined in which the semantic notation "dst.zone.name" stands for "name of zone to which traffic is destined" and semantic notation of "src.zone.name" stands for "name of zone from which traffic is sourced". The firewall rule, i.e., the zone1-to-zone2-rule specifies that if the source of the traffic is a VM belonging to zone1 and the destination is a VM belonging to zone2, the "action" of the rule indicates that unidirectional traffic is permitted from the zone1 to zone2.

Figure 5:
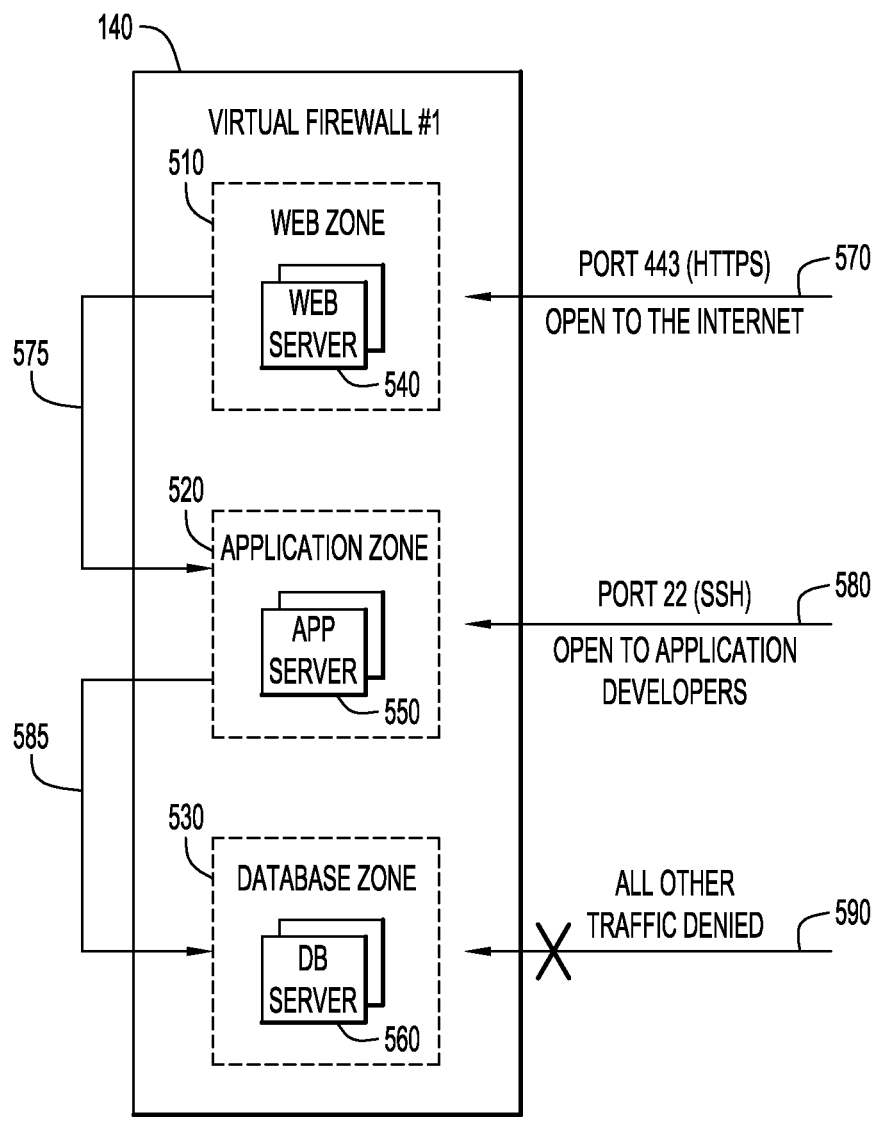
FIG. 5 is an example of a block diagram depicting a virtual firewall that is configured to implement the zone-based policy according to the techniques described herein.

To further illustrate some of the concepts of the zone-based firewall policy process logic 900, an additional example implementation is described in connection with FIG. 5. FIG. 5 shows the virtual firewall 140 from FIGS. 1-3. The virtual firewall 145 is responsible for traffic security for web zone 510, application zone 520, and database (DB) zone 530. Each of the zones 510, 520, and 530, has a corresponding number of servers, i.e., web zone 510 has a plurality of web servers 540, web zone 520 has a plurality of application servers 550, and database zone 530 has a plurality of DB servers 560, respectively.

For this example, the following is a zone-based security policy: 1) for Internet traffic to web servers 540, hypertext transfer protocol-secure (HTTPS) traffic is allowed; 2) for office subnet 10.0.0.x traffic to application (APP) servers 550, secure shell (SSH) traffic is allowed; 3) Web servers 540 traffic to app servers 550, HTTPS traffic is allowed; 4) app servers 550 to DB servers 560, any application traffic is allowed; 5) all other traffic is denied; and the name of all VMs are set-up to reflect their function in a 3-tiered (web/application/db zone) application model. For example, all web servers use names such as "web-server-1", "web-server-2", etc., and all application servers use names such as "app-server-1", "app-server-2", etc. Based on the above assumptions, a zone-based firewall policy is created as follows:

```
> zone web_zone
>       condition 1 vm.name contains "web"
> zone app_zone
>       condition 1 vm.name contains "app"
> zone db_zone
>       condition 1 vm.name contains "db"
```

Based on the above-defined zones, the firewall rules are created using zone and network based attributes, as follows:

```
> rule inet_web_rule
>       condition 1 dst.zone.name equals web_zone
>       condition 2 dst.net.port equals 443
>       action permit
> rule office_app_ssh_rule
>       condition 1 dst.zone.name equals app_zone
>       condition 2 src.net.ip-address prefix 10.0.0.0 mask
255.255.255.0
>       condition 3 dst.net.port equals 22
>       action permit
> rule web_app_https_rule
>       condition 1 src.zone.name equals web_zone
>       condition 2 dst.zone.name equals app_zone
>       condition 3 dst.net.port equals 443
>       action permit
> rule app_db_rule
>       condition 1 src.zone.name equals app_zone
>       condition 2 dst.zone.name equals db_zone
>       condition 3 dst.net.port equals any
>       action permit
> rule default_deny_rule
>       action deny
```

It should be noted that ports 443 and 22 are standardized ports for HTTPS and SSH traffic, respectively, and thus are used to enforce the zone-based policy model.

In FIG. 5, at 570, an HTTPS request is received and permitted by the inet_web_rule to access web zone 510. The web servers 540, in processing the request 570, may need to access the application zone 520 and send an HTTPS request 575, which is permitted by the web_app_rule, to the application servers 550. The application servers 550 may need database information from the database zone 530 and send a request 585 to the DB servers 560. According to the app_db_rule of the firewall policy, any internal traffic type is permitted between the app zone 520 and the db zone 530. This is because any and all traffic between the app and db zones is known to be secure. Any responses from the DB zone and subsequently APP zone are passed to the web zone in order to respond to request 570.

In addition to Internet requests, e.g., request 570, application developers may need access to the application zone. For example, employees of Tenant A or Tenant B may be working to enhance applications, correct software defects (bugs), or provide new applications to the APP zone 520. In this example, communications at 580 would be handled via SSH communications, as permitted by the office_app_ssh_rule of the zone policy for firewall 145. At 590, any other traffic that is not "permitted" by the firewall policy is "denied" according to the default_deny_rule.

In order to fully configure the firewall 145 according the three-tiered policy, the complete three-tiered policy would be provisioned as follows:

```
> policy 3-tiered-policy
>       rule inet_web_rule
>       rule office_app_ssh_rule
>       rule web_app_rule
>       rule app_db_rule
>       rule default_deny_rule
```

Figure 6A:
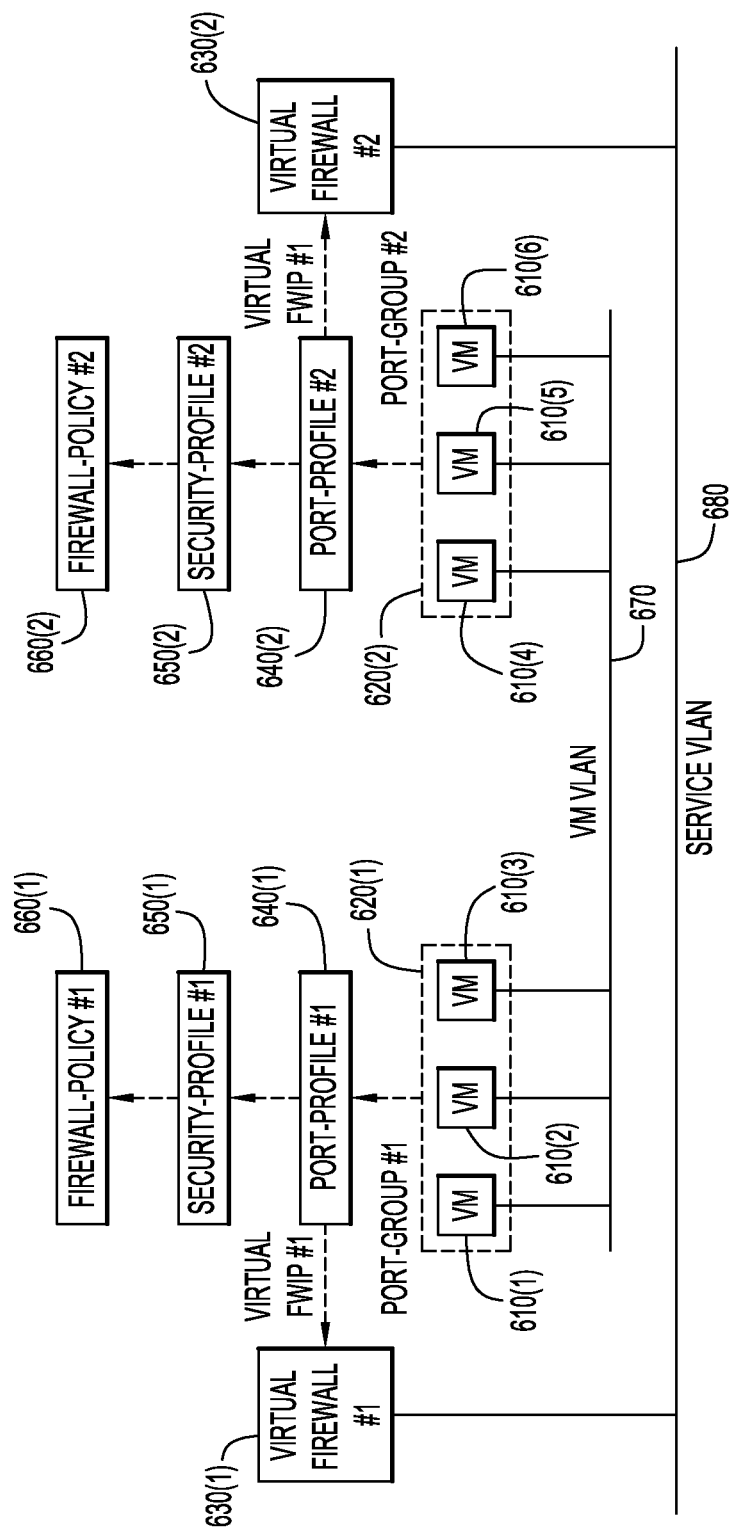
FIG. 6A is an example of a diagram depicting a virtual firewall provisioning model according to a first example.
Figure 6B:
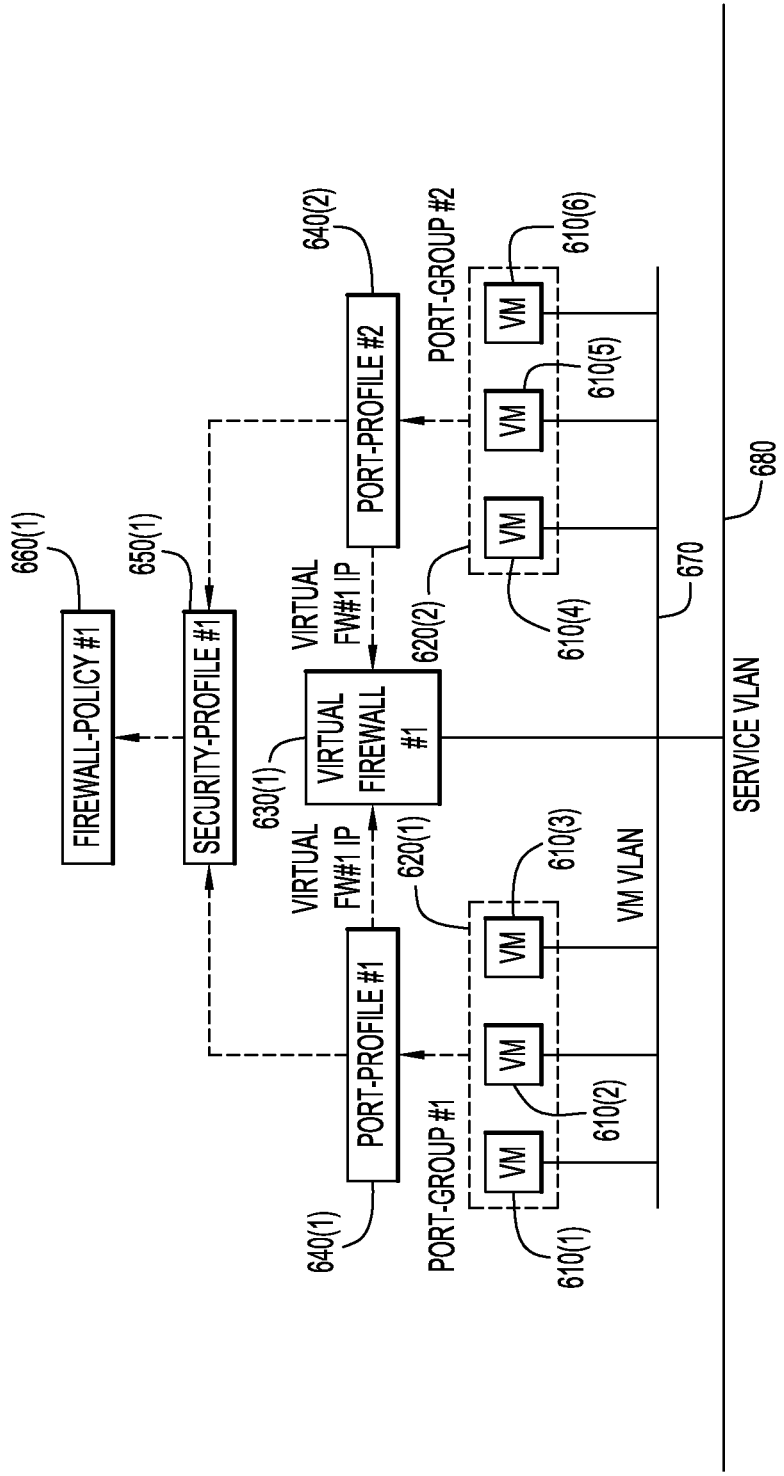
FIG. 6B is an example of a diagram depicting a virtual firewall provisioning model according to a second example.
Figure 6C:
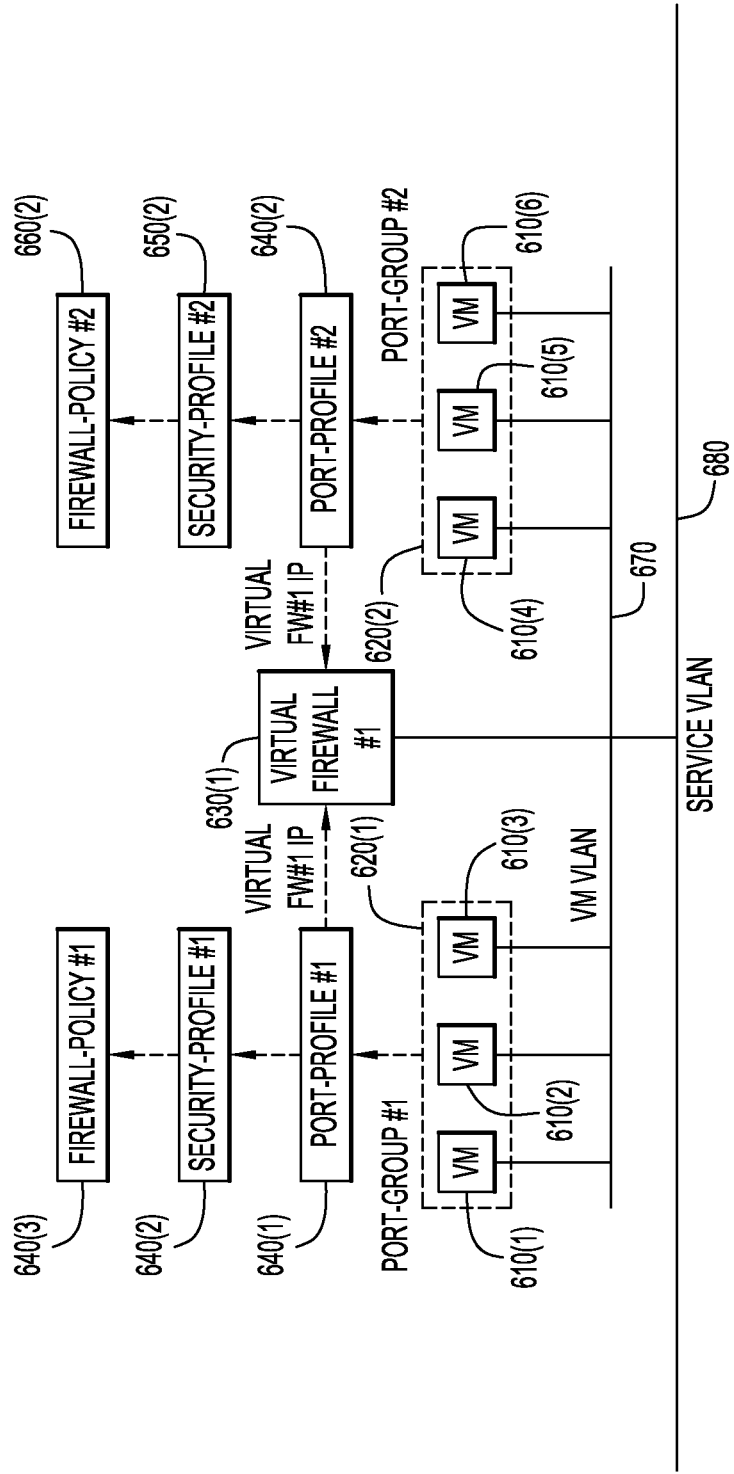
FIG. 6C is an example of a diagram depicting a virtual firewall provisioning model according to a third example.

Referring to FIG. 6A, the first of four use cases for example virtual firewall provisioning models are now described for implementing the zone-based firewall policy process logic 900 to provide firewall segmentation features. The four use cases described herein with respect to FIGS. 6A, 6B, and 6C are: 1) different sets of VMs using different firewalls and using different firewall policies, 2) different sets of VMs share the same firewall and firewall policy, and 3) different sets of VMs sharing the same firewall but using different firewall policies.

FIG. 6A shows two sets of VMs that use different firewalls and use different firewall policies. VMs 610(1)-610(3) comprise a first set of VMs. The VMs 610(4)-610(6) comprise a second set of VMs. The first set of VMs is associated with a first port group 620(1) and the second set of VMs is associated with a second port group 620(2). The VMs associated with the first port group 620(1) receive firewall services from virtual firewall 630(1) and the VMs associated with the second port group 620(2) receive firewall services from virtual firewall 630(2). Each of the VMs 610(1)-610(6) associated with port groups 620(1) and 620(2), respectively, each have assigned port profiles 640(1) or 640(2), as described above. As shown, each port profile is programmed with the servicing firewall's Internet Protocol (IP) address to facilitate traffic testing against firewall policy. Bound to each port profile 640(1) and 640(2) is a security profile 650(1) and 650(2), respectively. The security profiles 650(1) and 650(2) contain security information as the name suggests and each security profile refers to the virtual firewall policy that will be used.

When a new VM is instantiated, the server administrator assigns appropriate port profiles to the virtual Ethernet port of the VM. Since a port profile uniquely refers to a security profile and hence the VM's zone membership, security controls are immediately applied. A VM can be re-purposed by assigning a different port profile and/or security profile, and thus allows for flexible interchangeability among the port profiles and security profiles. Similarly, when VM migration events are triggered, the VMs may move across physical servers as shown in FIG. 2B. The virtualization hardware and associated software ensure that each VM's port profile policies follow the VMs during migration. Accordingly, the associated security profiles also follow the moving VMs, and security enforcement and monitoring remain transparent to migration events.

In addition to the port profiles 640(1) and 640(2) and the security profiles 650(1) and 650(2), firewall policies 660(1) and 660(2) may be attached or bound to the respective security or port profiles. By associating the firewall policies 660(1) and 660(2) with the port profile or security profile, the firewall policy will follow a VM during migration even when the VM migrates to a device outside of the data center. By attaching the firewall policy to the VM any new servicing firewall can import the VM's firewall policy during migration or a current firewall can immediately apply the firewall policy upon VM instantiation. The flexibility of the above-described segmentation model will become evident during the description of FIGS. 6B, 6C, and, 6D.

Also shown in FIG. 6A, are VM VLAN 670 and service VLAN 680. VM VLAN 670 is used for inter-VM communication as well as for external communications. The service VLAN 680 is used for switch-to-firewall communication. By way of example, ingress or egress traffic to be sent over the VM VLAN 670 is first redirected to the appropriate servicing firewall, e.g., virtual firewall 630(1) or 630(2) in order to determine if the traffic meets the conditions of the zone-based firewall policy process logic 900, and to perform the appropriate actions thereon. The traffic redirection may be performed through an overlay tunnel built on top of the service VLAN. The redirection is made simpler by the fact that the servicing firewall's IP address is programmed into each port profile.

Referring to FIG. 6B, the second firewall segmentation use case will now be described. In this example, a single firewall 630(1), single security profile 650(1), and firewall policy 660(1) are used to provide firewall services to VMs in port groups 620(1) and 620(2). Each of the port groups 620(1) and 620(2) has a port policy 640(1) and 640(2), respectively. The virtual firewall IP address for single firewall 630(1) is programmed into each of the port groups 620(1) and 620(2). VM ingress and egress traffic is tested against firewall policy as described in connection with FIG. 6A.

Referring to FIG. 6C, the third firewall segmentation use case is now described. In this example, a single firewall 630(1) is used to provide firewall services to VMs in port groups 620(1) and 620(2). Each of the port groups 620(1) and 620(2) has a port policy 640(1) and 640(2), respectively, and each port group has separate security profiles 650(1) and 650(2), and separate firewall policies 660(1) and 660(2). The virtual firewall IP address for single firewall 630(1) is programmed into each of the port groups 620(1) and 620(2). VM ingress and egress traffic is tested against firewall policy as described in connection with FIG. 6A.

Figure 7A:
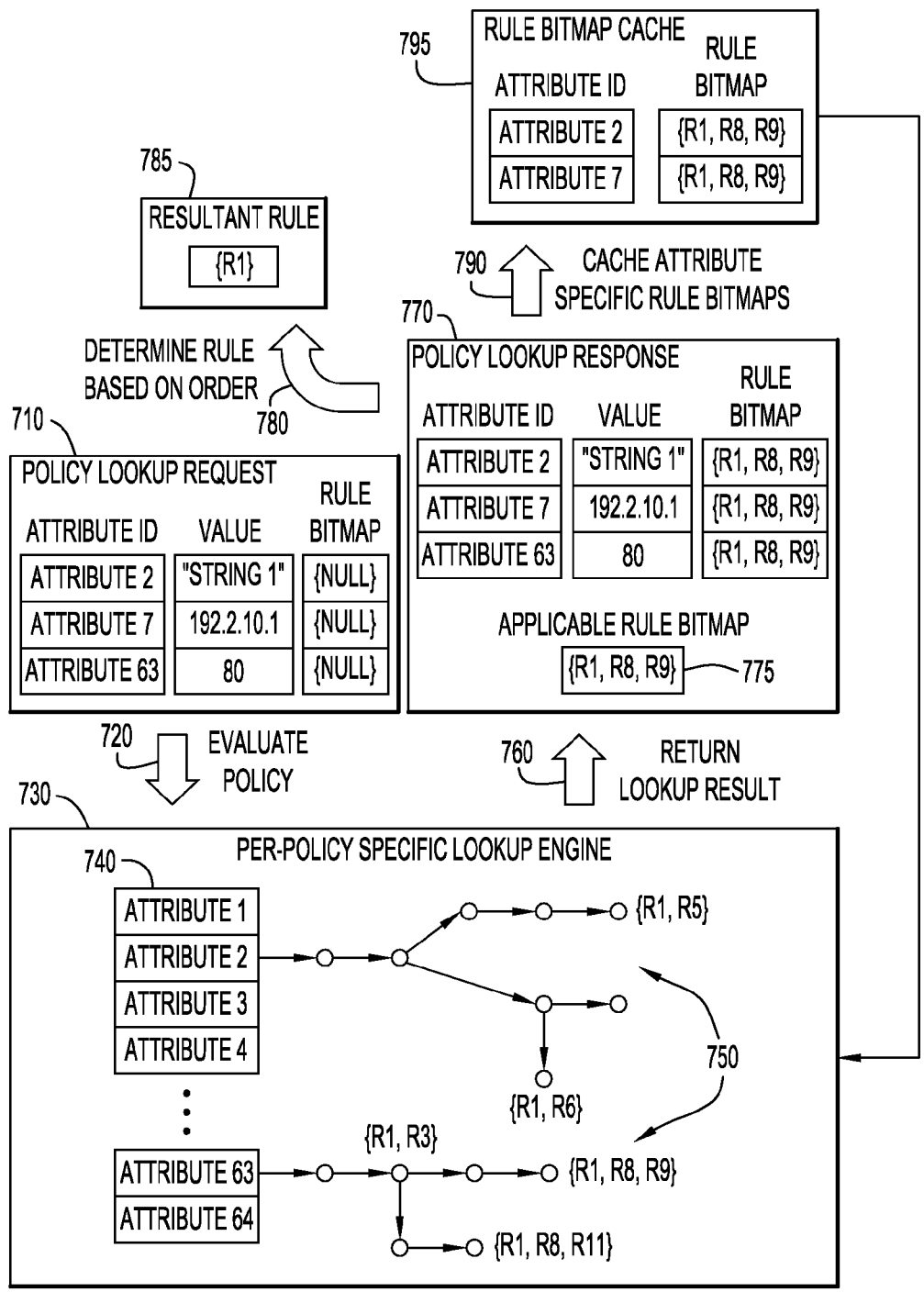
FIG. 7A is an example of a flowchart generally depicting a process for caching results of firewall policy rules retrieved from a firewall policy lookup engine.

Turning now to FIG. 7A, an example of a flowchart is shown generally depicting a process for caching results of firewall policy rules retrieved from a firewall policy lookup engine. At 710, a policy lookup request is formed or generated. An incoming packet parsed and a policy lookup request is built containing the various attribute values derived from the incoming packet. The lookup request has one or more attribute identifiers (IDs), a corresponding value, and rule bitmap. The attribute ID is simply a number or representation of an attribute, e.g., attribute 2 may represent a source or destination VM name, attribute 7 is an IP address, and attribute 63 is a port number. The corresponding values are "STRING 1", 192.2.10.1, and 80. The rule bitmap is map representing a set of rule IDs and may be used to store a set of applicable rules. The rule bitmap at 710 has null values indicating that the rule bitmaps need to be produced by the policy lookup engine. Rule bitmaps are enclosed in brackets, e.g., {R1}, which stands for a rule bitmap containing rule {R1}.

At 720, the policy lookup request 710 is sent to a per-policy specific lookup engine 730. For a given firewall policy, there is a policy lookup engine, which consists of a number of attribute specific lookup data structures. At 740, attribute IDs specified in a rule are used as an index for finding corresponding per attribute lookup data structures. These rules are similar to the rules described in connection with FIG. 4. For all the attributes used in the firewall policy, there is a corresponding lookup data structure for storing the searching patterns and the relevant rule bitmaps for all the applicable rules. These data structures are shown at 750 and comprise lookup nodes that may or may not lead to a rule bitmap. A lookup node is a searching pattern database for storing all the lookup patterns relevant to a specific attribute. The lookup nodes can be mathematical tries or radix trees, e.g., a Patricia Tree node, or an Aho-Corasick deterministic finite automation (DFA) or Interval node, or an Integer Interval node.

In this example, if the attribute 2 value of "STRING 1" were to match a lookup pattern, then one of rule bitmaps {R1}, {R1, R5}, or {R1, R6} would be returned for attribute 2. Similarly, if attribute 63 port 80 were to match the first two nodes, "80" having only two digits, then the rule bitmap {R1, R3} would be returned. Within the policy lookup engine 730, each of the attribute records are run through the per attribute lookup data structures to check if the input attribute value would match any stored lookup pattern. While any pattern is matched in the lookup data structures, the applicable rule bitmap is collected as a result of the lookup for a particular attribute. At the end of the processing loop for all of the attributes, all of the retrieved bitmaps would be logically AND'ed and, at 760, returned as a consolidated lookup result for the given lookup request. The policy lookup engine 730 would return a rule bitmap consisting of zero or more rule(s) in the bitmap. The returned rule bitmap would then be passed to an algorithm to determine the final rule to be used to decide the policy evaluation result for the firewall.

An example policy lookup response is shown at 770. The policy lookup response 770 is similar to the policy lookup request, except that the rule bitmaps have been filled in with consolidated applicable rule bitmap generated by the policy lookup engine 730 and shown at 775. At 780, the applicable rule bitmap 775 is sent to a first applicable rule selection mechanism that selects one of the rules to be used by the virtual firewall. As an example, at 785, the resultant rule {R1} has been selected for use by the virtual firewall in order to process the incoming packet. The resultant rule may be selected by a selection mechanism based on the order of the rules as presented in the applicable rule bitmap 775. At 790, attribute specific rule bitmaps are cached. The cached rule bitmaps are shown at 795. Note that {R1, R8, R9} rule bitmaps associated with attribute 63 are not cached because the attribute is not cacheable and therefore only a partial lookup result is cached. The partial lookup results, i.e., cached rule bitmaps, of each individual attribute for a particular end-point can be submitted to the policy engine on subsequent lookups. The use of cached rule bitmaps in a subsequent lookups is described in connection with FIG. 7B.

Depending on the network environment, some attributes change more frequently than others. For example, Transmission Control Protocol (TCP) or User Datagram Protocol (UDP) ports used by various applications, dates and times, and Ethertype attributes may change frequently, while VM attributes, user attributes, end-point IP addresses change less frequently. Caching rule bitmaps for attributes that change frequently may not be efficient. Accordingly, a bitmap caching bit or flag may be used to allow or bar attribute caching for a particular attribute. The performance of the policy engine is improved by eliminating the need for intermediate rule bit-map lookups for certain cacheable attributes that change less frequently.

Figure 7B:
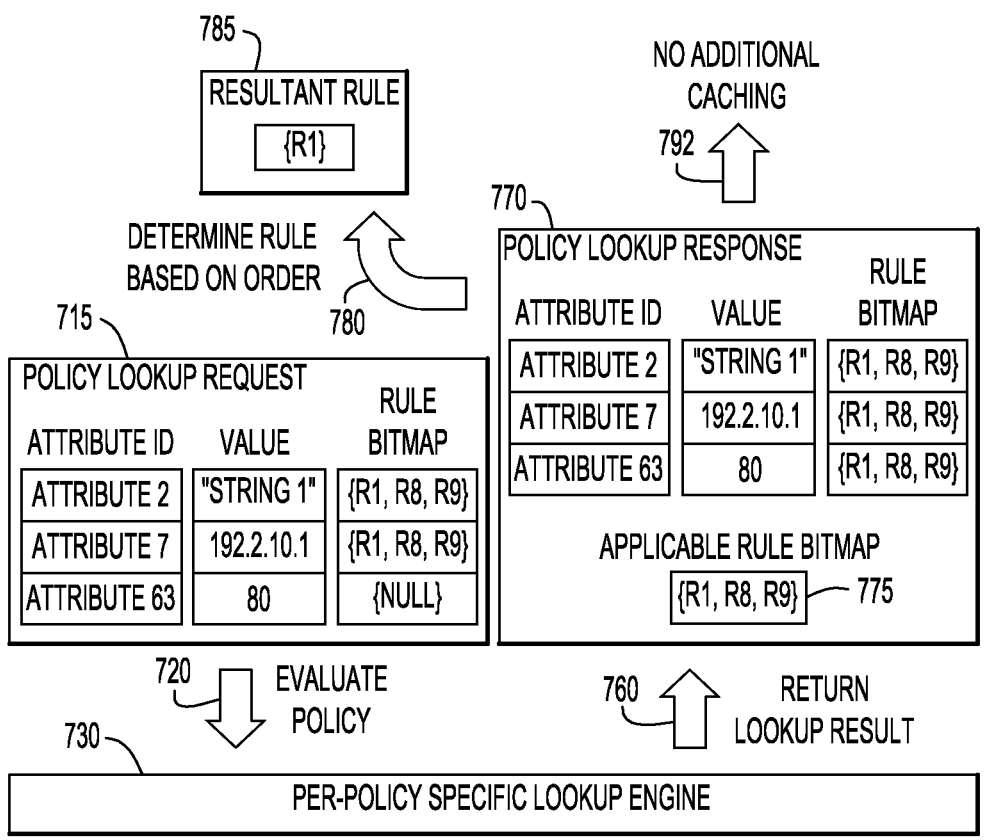
FIG. 7B is an example of a flowchart generally depicting the use of cached firewall policy rules.

Referring to FIG. 7B, an example of a flowchart is shown generally depicting a process for using cached firewall policy rules retrieved from the firewall policy lookup engine. At 715, a policy lookup request is generated. An incoming packet is parsed and a policy lookup request is built containing the various attribute values derived from the incoming packet. Once the attributes are obtained, the cache is checked for any cached rule bitmaps. In this example, the partial lookup results, i.e., cached rule bitmaps, of each individual attribute for a particular end-point have been pre-filled in for attributes 2 and 7. At 720, the policy lookup request 715 is sent to the per-policy specific lookup engine 730.

Barring any changes to the data within, the policy lookup engine 730 will not have to parse any of the lookup data structures for rule bitmaps that have been supplied in the lookup request, e.g., request 715, and can simply return the cached results at 760. The policy lookup response 770 contains the same data as shown in FIG. 7A, and at 792, no additional caching is performed since the rule bitmaps are already cached. The consolidated applicable rule bitmap only contains rule bitmaps for attributes that have their caching flag set to the proper value and that were not provided in the policy lookup request. The rule determination 780 and resultant rule 785 operate as described in connection with FIG. 7A.

Figure 8:
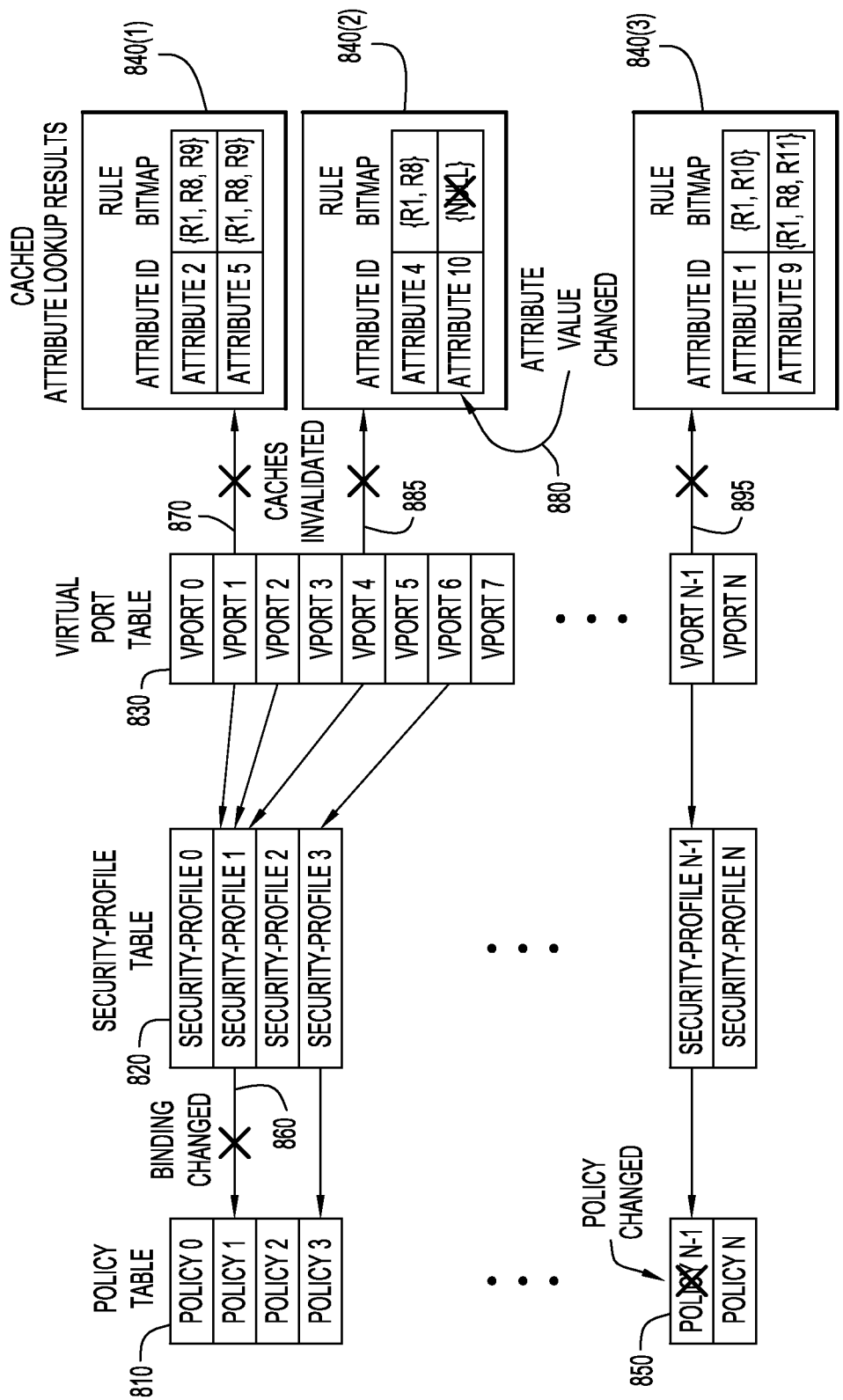
FIG. 8 is an example of a diagram generally depicting a mechanism to reset the cached firewall policy rules.

Referring to FIG. 8, an example of a diagram generally depicting a mechanism to reset the cached policy lookup results is shown. FIG. 8 generally depicts data that is available to the firewall for enforce any particular security policy. The data includes a policy table 810, a security profile table 820, a virtual port (VPort) table 830, and any corresponding cached attribute lookup results 840(1)-840(3). The policy table 810, security profile table 820, and VPort table 830 may contain actual data or pointers to the policy and profile data.

A particular attribute lookup cache is invalidated when an associated firewall policy configuration changes, a cacheable attribute value changes, or when security-profile to firewall policy associations change. As an example, whenever a firewall policy configuration changes, the policy lookup results for the subsequent lookup request would potentially change. Thus, all the cached attribute lookup results relevant to the given firewall policy would need to be invalidated. The various invalidation scenarios are illustrated in FIG. 8.

The cached attribute values 840(1)-840(3) may be stored as part of a corresponding VPort structure. A VPort corresponds to a vNIC attached to a given VM. Each VPort is indirectly tied or mapped to a particular firewall policy by a chain of references, e.g., VPort→security-profile→policy. Each VPort entry is used for caching the per attribute lookup results. At 850, when firewall policy N-1 is changed, the VPort N-1 entries that are mapped to the firewall policy are examined and all of the cached lookup results are invalidated. In this example, at 895, cache 840(3) is invalidated or emptied, and although not shown, the rule bitmaps would be set to {NULL}.

As described above, the security-profile is a tool for provisioning firewall policy to a VM. There is a one-to-one mapping between security-profile and firewall policy. If a security-profile to firewall policy association is changed, the VMs that are associated with that particular security-profile are determined, and the corresponding VPort cached lookup results entries are invalidated. At 860, the security-profile 1 to policy 1 binding has changed. VPorts 1, 2, and 4 are associated with security-profile 1, and at 870 and 885, caches 840(1) and 840(2) are invalidated, and although not shown, the rule bitmaps would be set to {NULL}.

Whenever the attribute value, e.g., VM attributes, for any cacheable attribute changes, corresponding VPort entries are determined and the cached lookup results only for those changed attributes are invalidated. In this example, attribute 10 has changed and is found in cache 840(2), and at 880, attribute 10 is invalidated by setting the attribute rule to {NULL} as shown. When individual attributes change, the associations are maintained from a VM to its constituent VPorts and from a security-profile to its constituent VMs.

Figure 9:
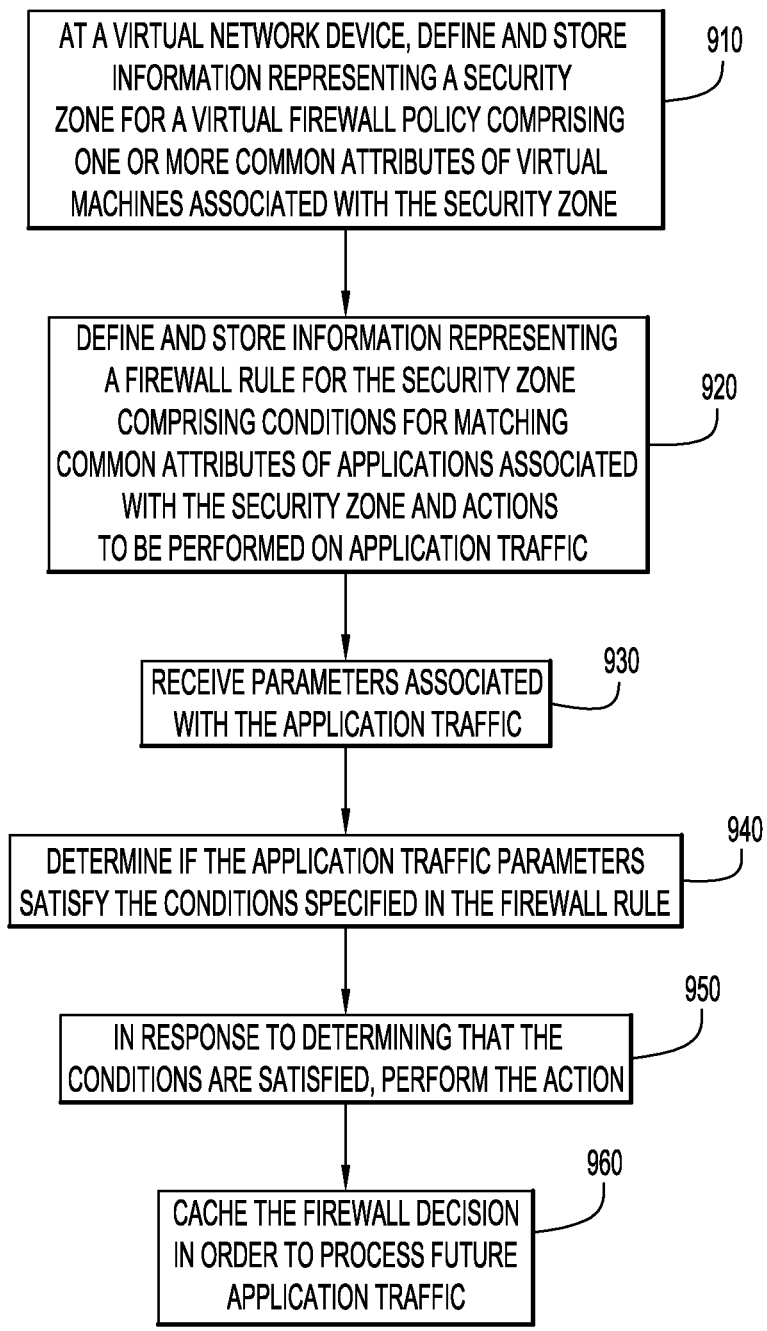
FIG. 9 is an example of a flowchart generally depicting a process for implementing the zone-based firewall policy according to the techniques described herein.

Referring to FIG. 9, an example of a flowchart is shown that generally depicts the operations of the process logic 900 that implements a zone-based firewall policy. At 910, at a virtual network device, information representing a first security zone is defined and stored for a virtual firewall policy comprising one or more common attributes of virtual machines associated with the first security zone. These attributes may be any attributes available to the firewall. At 920, information representing a first firewall rule is defined and stored for the first security zone comprising first conditions for matching common attributes of applications associated with the first security zone and an action to be performed on application traffic. At 930, parameters associated with the application traffic are received. The parameters in use rely on the virtual machines or sets of virtual machines to be appropriately provisioned. At 940, it is determined if the application traffic parameters satisfy the first conditions of the first firewall rule, and at 950, in response to determining that the first conditions are satisfied, the action is performed. The action may permit or deny the application traffic to be sent to or from an application associated with the first security zone. At 960, the action or firewall decision is cached in order to process future application traffic, i.e., caching any policy decisions frees the policy engine form extensive processing in the future.

Further techniques are provided that comprise, for the first firewall rule, defining and storing information representing second conditions for matching common attributes of applications associated with a second security zone. A determination is made whether the application traffic parameters satisfy the second conditions of the first firewall rule, and in response to determining that the first conditions and the second conditions are satisfied, and the action is performed. The action may permit the application traffic to traverse the first and second security zones such that bidirectional application traffic is available, or stop the application traffic from traversing the first and second security zones.

Information representing a second security zone may be defined and stored for the virtual firewall policy comprising one or more common attributes of applications associated with the second security zone. Information may also be defined and stored that represents a second firewall rule for the second security zone comprising second conditions for matching common attributes of applications associated with the second security zone and an action to be performed on application traffic. A determination is made whether the application traffic parameters satisfy the second conditions of the second firewall rule and in response to determining that the first conditions and the second conditions are satisfied, the action defined in the second firewall rule is performed. The action defined in the first and second firewall rules permits or denies application traffic to traverse the first and second security zones.

Information may be defined and stored that represents a port profile comprising network parameters configured to permit inter-application communication. Information is stored that associates the virtual firewall policy with the port profile. An application is provisioned with the port profile such that when the application migrates from one device to another device the associated virtual firewall policy remains with the application.

Additional techniques are provided for assigning a rule identifier to the first firewall rule. An attribute identifier is assigned to each of the one or more common attributes. The rule identifier is associated with each of the one or more common attribute identifiers and the information representing the first security zone comprises attribute identifiers and the associated rule identifier stored in a database associated with a firewall policy specific lookup engine. Data may be generated that represents an ordered tree mathematical structure for each of the one or more common attributes and the information representing the first security zone comprises the data representing the ordered tree mathematical structure stored as attribute specific data structures for looking up rules associated with the common attributes.

A policy lookup request may be generated comprising at least one lookup attribute identifier and an associated lookup attribute value based on the application traffic parameters. A determination is made whether the at least one lookup attribute identifier and lookup attribute value match an attribute identifier and an attribute value stored in the information representing the first security zone. In response to determining that a match exists, the rule identifier associated with the attribute identifier and the attribute value is returned. The first firewall rule is retrieved based on the rule identifier prior to determining if the application traffic parameters satisfy the first conditions of the first firewall rule. The attribute identifier, the attribute value, and the rule identifier may be cached in memory.

The zone-based firewall policy offers advantages with respect to previously used techniques. A security zone defined by zone rules can use any attribute that is available on the firewall. In the case of a virtual firewall, the attributes include VM and custom attributes such as VM name, VM Guest OS, port-profile names, etc. Thus, the zone rules provide flexibility, are semantically easy to write, and provide for a zone-based firewall policy to protect VMs in various virtualized environments.

The zone rule interface also provides an opportunity for associating incoming traffic with multiple security zones. This multi-zone membership feature extends the granularity of the policy model and users can write more sophisticated firewall policies. Using zones as a rule match criteria, and not a policy application domain, reduces the total number of firewall policies that are maintained on a firewall. Accordingly, these techniques provide a flexible and scalable tool for managing firewall policy in a virtualized environment.

By using source and destination zone attribute semantics, e.g., src.zone.name or dst.zone.name, the zone-based policy provides a simple way to assign directional sense to a firewall policy for zone to zone traffic (e.g. zone A→zone B, zone B→zone A, and within zone A). As a result, additional configuration objects such as zone-pairs are not needed to provide a directional sense.

The firewall segmentation approach by way of the zone-based policy provides additional advantages over earlier techniques. For example, existing port-profile and switching components can be used to 1) automatically provision a firewall to a given set of VMs, and 2) steer VM traffic to firewall via over-lay tunnel. Configuration changes to the network topology and VM attachment changes on the network are avoided.

The flexible provisioning model uses a combination of firewall node, port-profile, security-profile, and policy bindings. The model allows users to be able to address different virtual firewall configuration requirements in mitigating inter-VM and VM-external traffic. The centralized firewall-node and distributed traffic steering approach allows firewall nodes to be able to protect a given set of VMs from any of the physical hosts on the network. As a result, the firewall function is consistently provisioned regardless of whether or not any of the VMs or firewall server VMs migrate from one physical host to another.

In the zone-based provisioning scheme described herein, the firewall service VM is designed to be dedicated for protecting a given set of VMs attached to a network regardless of the network topology and boundaries of physical hosts. Accordingly, these techniques are well suited for multi-tenant environments, where every tenant prefers to instantiate a dedicated firewall service VM for protecting a set of tenant-specific VMs.

Service providers can provide a virtual firewall management interface in their auto-servicing portal for their customers to instantiate and provision one or more virtual firewall instances on the tenant specific virtual data center networks and corporate users can instantiate and provision virtual firewalls to protect certain VMs running mission critical applications possessing sensitive data for each of their internal organizations.

Caching rule bitmaps enhances policy lookup performance by reducing the number of attribute lookups required. By caching attribute lookup results, the policy engine can reuse the cached results for evaluating the rules. Thus, policy lookup is limited to only those attributes whose values are constantly change such as TCP port number or timestamp. The policy engine may also be used for classifying security-zone membership of a VM. Using the same caching algorithm, the security-zone membership of each VM can also be cached in a per VM data structure. The cached security-zone membership allows a policy lookup engine to bypass zone classification lookups.

In summary, techniques are provided herein for implementing a zone-based firewall policy. At a network device, information is defined and stored that represents a first security management} zone for a virtual firewall policy comprising one or more common attributes of applications (e.g., virtual machines) associated with the first security. Information is defined and stored that represents a first firewall rule for the first security zone and comprises first conditions for matching common attributes of applications associated with the first security zone and an action to be performed on application traffic. Parameters associated with the application traffic are received. A determination is made whether the application traffic parameters satisfy the first conditions of the first firewall rule and in response to determining that the first conditions are satisfied, the action is performed.

The above description is intended by way of example only.

What is claimed is:

1. A method comprising:
  at a virtual network device, defining and storing information representing a security management zone for a virtual firewall policy comprising one or more common attributes of applications associated with the security management zone;
  defining and storing information representing a firewall rule for the security management zone comprising conditions for matching common attributes of applications associated with the security management zone, and an action to be performed on application traffic;
  receiving parameters associated with the application traffic;

generating a policy lookup request comprising at least one lookup attribute identifier, the lookup attribute identifier identifying a common attribute and an associated lookup attribute value based on the application traffic parameters;

determining that the at least one lookup attribute identifier of the policy lookup request matches a cached attribute identifier stored in a cache of lookup results;

in response to determining that a match exists, returning a rule identifier associated with the cached attribute identifier, wherein the rule identifier identifies the firewall rule;

retrieving the firewall rule based on the rule identifier;

determining if the application traffic parameters satisfy the conditions of the firewall rule based on one or more results from the policy lookup request; and in response to determining that the conditions are satisfied, performing the action.

2. The method of claim 1, further comprising:
associating the rule identifier with each of the one or more common attribute identifiers,
and wherein storing the information representing the security management zone comprises storing attribute identifiers and the associated rule identifier in a database associated with a firewall policy specific lookup engine.

3. The method of claim 1, wherein determining further comprises determining that a match exists in the cache of lookup results without parsing, by a firewall policy specific lookup engine, one or more data structures as part of the policy lookup request.

4. The method of claim 1, further comprising:
determining that the policy lookup request contains at least one lookup attribute identifier that does not match a cached attribute identifier stored in the cache of lookup results;
determining via the firewall policy specific lookup engine if the at least one lookup attribute identifier and the associated lookup attribute value match an attribute identifier and an attribute value stored in the information representing the security management zone; and
in response to determining via the firewall policy specific lookup engine that a match exists, returning the rule identifier associated with the attribute identifier and the attribute value.

5. The method of claim 4, further comprising caching the lookup attribute identifier, the lookup attribute value, and the rule identifier, associated with the lookup attribute identifier that was determined not to exist in the cache of lookup results.

6. The method of claim 1, further comprising:
determining that the lookup attribute value corresponding to the lookup attribute identifier has changed from a previous value; and
in response to determining that the lookup attribute value has changed, invalidating one or more entries in the cache of lookup results corresponding with the lookup attribute identifier associated with the lookup attribute value.

7. The method of claim 1, further comprising:
determining that a configuration change has occurred in either the virtual firewall policy or the security management zone; and
in response to determining that a configuration change has occurred, invalidating one or more entries in the cache of lookup results that are mapped to the security management zone or the virtual firewall policy.

8. An apparatus comprising:
one or more network interfaces; and
a processor coupled to the network interfaces, and configured to:
define and store information representing a security management zone for a virtual firewall policy comprising one or more common attributes of applications associated with the security management zone;
define and store information representing a firewall rule for the security management zone comprising conditions for matching common attributes of applications associated with the security management zone, and an action to be performed on application traffic;
receive parameters associated with the application traffic;
generate a policy lookup request comprising at least one lookup attribute identifier, the lookup attribute identifier identifying a common attribute and an associated lookup attribute value based on the application traffic parameters;
determine that the at least one lookup attribute identifier of the policy lookup request matches a cached attribute identifier stored in a cache of lookup results;
in response to determining that a match exists, return a rule identifier associated with the cached attribute identifier, wherein the rule identifier identifies the firewall rule;
retrieve the firewall rule based on the rule identifier;
determine if the application traffic parameters satisfy the conditions of the firewall rule based on one or more results from the policy lookup request; and
perform the action in response to determining that the conditions are satisfied.

9. The apparatus of claim 8, wherein the processor is further configured to:
associate the rule identifier with each of the one or more common attribute identifiers; and
store attribute identifiers and the associated rule identifier in a database associated with a firewall policy specific lookup engine.

10. The apparatus of claim 8, wherein the processor is further configured to determine that a match exists in the cache of lookup results without parsing, by a firewall policy specific lookup engine, one or more data structures as part of the policy lookup request.

11. The apparatus of claim 8, wherein the processor is further configured to:
determine that the lookup attribute value corresponding to the lookup attribute identifier has changed from a previous value; and
invalidate one or more entries in the cache of lookup results corresponding with the lookup attribute identifier associated with the lookup attribute value in response to determining that the lookup attribute value has changed.

12. The apparatus of claim 8, wherein the processor is further configured to:
determine that a configuration change has occurred in either the firewall policy or the security management zone; and
invalidate one or more entries in the cache of lookup results that are mapped to the security management zone or the virtual firewall policy in response to determining that a configuration change has occurred.

13. One or more non-transitory computer readable media storing instructions that, when executed by a processor, cause the processor to:

define and store information representing a security management zone for a virtual firewall policy comprising one or more common attributes of applications associated with the security management zone;

define and store information representing a firewall rule for the security management zone comprising conditions for matching common attributes of applications associated with the security management zone, and an action to be performed on application traffic;

receive parameters associated with the application traffic;

generate a policy lookup request comprising at least one lookup attribute identifier, the lookup attribute identifier identifying a common attribute and an associated lookup attribute value based on the application traffic parameters;

determine that the at least one lookup attribute identifier of the policy lookup request matches a cached attribute identifier stored in a cache of lookup results;

in response to determining that a match exists, return a rule identifier associated with the cached attribute identifier, wherein the rule identifier identifies the firewall rule;

retrieve the firewall rule based on the rule identifier;

determine if the application traffic parameters satisfy the conditions of the firewall rule based on the one or more results from the policy lookup request; and perform the action in response to determining that the conditions are satisfied.

14. The non-transitory computer readable media of claim 13, further comprising instructions that, when executed by the processor, cause the processor to:

associate the rule identifier with each of the one or more common attribute identifiers; and store the information representing the security management zone comprising attribute identifiers and the associated rule identifier in a database associated with a firewall policy specific lookup engine.

15. The non-transitory computer readable media of claim 13, further comprising instructions that, when executed by the processor, cause the processor to determine that a match exists in the cache of lookup results without parsing, by a firewall policy specific lookup engine, one or more data structures as part of the policy lookup request.

16. The non-transitory computer readable media of claim 13, further comprising instructions that, when executed by the processor, cause the processor to:

determine that the lookup attribute value corresponding to the lookup attribute identifier has changed from a previous value; and invalidate one or more entries in the cache of lookup results corresponding with the lookup attribute identifier associated with the lookup attribute value, in response to determining that the lookup attribute value has changed.

17. The non-transitory computer readable media of claim 13, further comprising instructions that, when executed by the processor, cause the processor to: determine that a configuration change has occurred in either the firewall policy or the security management zone; and invalidate one or more entries in the cache of lookup results that are mapped to the security management zone or the virtual firewall policy, in response to determining that a configuration change has occurred.

18. The apparatus of claim 8, wherein the processor is further configured to:

determine that the policy lookup request contains at least one lookup attribute identifier that does not match a cached attribute identifier stored in the cache of lookup results;

determine, via the firewall policy specific lookup engine, if the at least one lookup attribute identifier and the associated lookup attribute value match an attribute identifier and an attribute value stored in the information representing the security management zone; and in response to determining via the firewall policy specific lookup engine that a match exists, return the rule identifier associated with the attribute identifier and the attribute value.

19. The apparatus of claim 18, wherein the processor is further configured to cache the lookup attribute identifier, the lookup attribute value, and the rule identifier, associated with the lookup attribute identifier that was determined not to exist in the cache of lookup results.

20. The non-transitory computer readable media of claim 13, further comprising instructions that, when executed by the processor, cause the processor to:

determine that the policy lookup request contains at least one lookup attribute identifier that does not match a cached attribute identifier stored in the cache of lookup results;

determine via the firewall policy specific lookup engine if the at least one lookup attribute identifier and the associated lookup attribute value match an attribute identifier and an attribute value stored in the information representing the security management zone; and in response to determining via the firewall policy specific lookup engine that a match exists, return the rule identifier associated with the attribute identifier and the attribute value.

* * * * *